Figure 1:
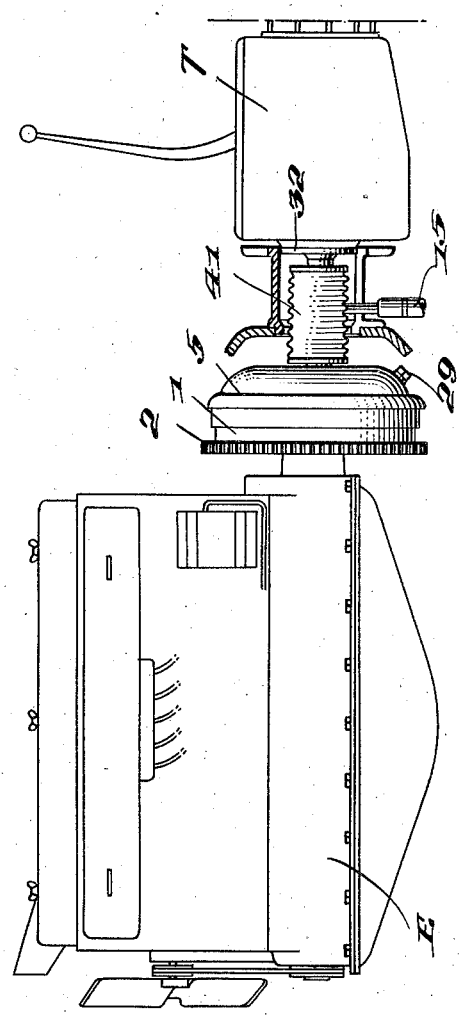

Aug. 12, 1941.　　　I. C. POPPER　　　2,252,642
HYDRAULIC COUPLING
Filed April 1, 1939　　　2 Sheets-Sheet 1

Inventor
Isaac C. Popper
By Vernon E. Hodges
H. Hamlin Hodges   his Attorneys

Aug. 12, 1941.  I. C. POPPER  2,252,642
HYDRAULIC COUPLING
Filed April 1, 1939  2 Sheets-Sheet 2
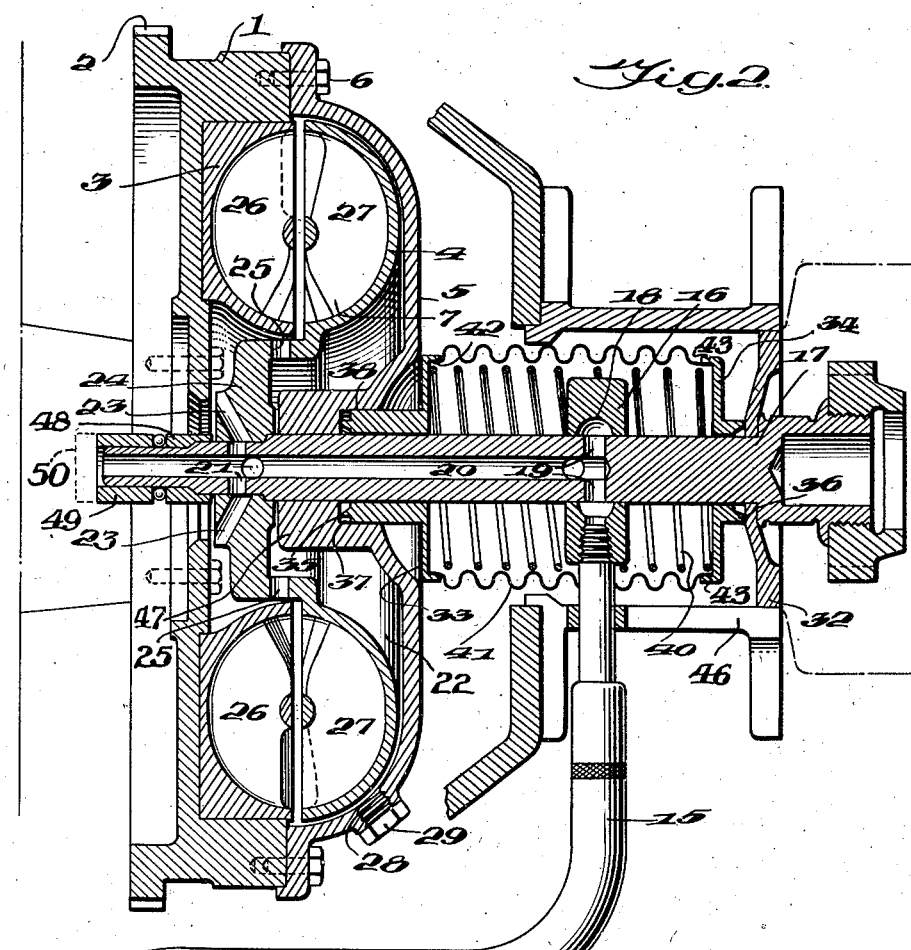
Fig. 2
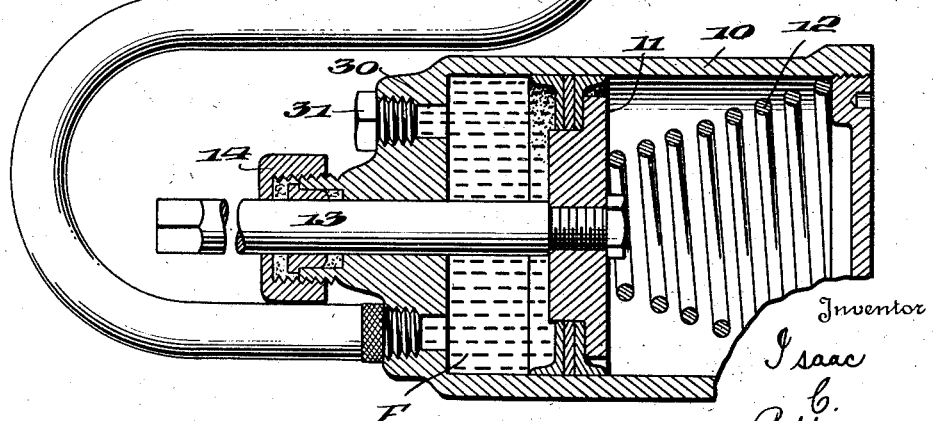
Inventor
Isaac C. Popper
By Vernon E. Hodges
H. Hamlin Hodges
his Attorneys Patented Aug. 12, 1941

2,252,642

UNITED STATES PATENT OFFICE 2,252,642

HYDRAULIC COUPLING

Isaac C. Popper, New York, N. Y., assignor to Automatic Turbine Drive Company, Inc., Providence, R. I., a corporation of New York Application April 1, 1939, Serial No. 265,506

3 Claims. (Cl. 60—54)

This invention relates to certain improvements in hydraulic couplings.

The object in view in this particular invention is to transmit motion from a moving to a stationary part through the medium of a fluid, especially adapted to the purpose, the action of which is under the control of the driver of the engine.

A further object is to provide a seal for preventing the escape of the transmitting fluid, while at the same time admitting of flexibility to take care of any movement of the parts between which the seal is placed, and regardless of any vibration or relative movement of parts of the hydraulic coupling.

The invention in its present form includes a driving and driven rotor mounted side by side concentrically about a shaft, each rotor having opposed concaved annular channels which are subdivided by radially disposed vanes of special and novel form, into a plurality of scoops or buckets of the turbine type which expel fluid from the buckets of one rotor to the buckets of the driven rotor, in that way affording a means of transmission of motion from one rotor to the other.

In the accompanying drawings:

Fig. 1 is an assembled view of an engine and gear transmission of any approved form, showing my improved structure therebetween; and Fig. 2 is an enlarged section through the rotors and connected parts including a compression cylinder which acts as a compensator and fluid reserve tank.

In Fig. 1, a fragmentary assembly is shown of a typical form of engine E and an ordinary transmission T, with my improved mechanism located between the two.

The numeral 17 indicates the driven shaft. This is counterbored through the center to form the channel 20, and ducts 19 and outlets 21 extend radially from the channel as well be hereinafter fully explained. Radial and thrust bearings 48 and 49 are provided for the left-hand end of this driven shaft 17, as shown in Fig. 2, and the left-hand end of the channel 20 is closed, by means 50 (as indicated in dotted lines in Fig. 2).

The numeral 1 represents a fly-wheel having the customary toothed periphery 2 for the starter (not shown) to engage.

The numeral 3 indicates the driving rotor integrally or rigidly secured to the fly-wheel as viewed in Fig. 2. The numeral 4 shows the turbine or driven rotor, and 5 is a casing or cover held by bolts or other means 6 to the fly-wheel 1, thereby enclosing the two rotors and forming a hydraulic chamber 7 therebetween, and an external chamber 22 between one of the rotors and the casing or cover 5 which communicates peripherally and through the hub 24 of turbine 4 with the hydraulic chamber 7.

The two rotors are provided with oppositely facing vanes forming buckets 26 and 27.

The stationary housing 46 serves as a support for the splash-plate or ring 32, which splash-plate or ring is free to rotate in the housing and forms a bearing for one end of driven shaft 17, and the hub 47 of the cover plate furnishes a bearing for the opposite end of the driven shaft 17. A circuit is formed for the transmitting fluid through the annular groove 18, in the collar 16, and the ducts 19, channel 20, and outlets 21 in the driven shaft through the ducts 23, 25, thence between the buckets 26 and 27 of the rotors 3 and 4, and the external chamber 22, thus supplying fluid to the hydraulic coupling working circuit.

A compression cylinder 10, shown in Fig. 2, serves as a compensator and a fluid reserve tank, and it has a piston 11 therein, which piston responds to the expansion and contraction of the fluid between the compression cylinder and the working circuit, due to the expansion and contraction of the fluid. Some form of pressure is exerted on one end of the piston, as, for instance, shown by the stiff spiral spring 12. This pressure means, as spring 12, exerts a forward pressure on the piston against the fluid F contained in the other end of the cylinder or on the other side of the piston.

A piston rod 13 extends through the head of the cylinder through a stuffing-box 14. A pipe 15 passes through the side wall of a bellows 41 and connects the fluid end of the cylinder 10 to the collar 16 which surrounds the driven shaft 17, and in this collar an annular groove 18 is formed, which spans the ducts 19 leading to the channel 20 extending through the longitudinal axis of the driven shaft 17 to the outlets 21, thence to the ducts 23 in the hub 24 of the driven rotor 4, and through these ducts 21, 23 and 25, also in the hub 24 of the driven rotor 4, fluid flows freely from the cylinder 10 through the tube 15 to the driven shaft 17 or ducts therein, and in the hub 24 of the driven rotor to the hydraulic chamber 7 and the communicating external chamber 22, into and out of the buckets 26 in the driving rotor and thence into the buckets 27 of the driven rotor, whereby to transmit motion from one to the other.

The chamber 7 is filled with fluid F through a hole 28 in the casing 5, and this hole is closed by means of a screw-plug 29. The cylinder 10 is filled with the fluid through an orifice 30 which is closed by a screw-plug 31, and to give the fluid the required degree of pressure the piston rod 13 is forced against the expansive pressure of the spring 12, and when the full complement of fluid F is fed into the cylinder the plug 31 is screwed into the orifice 30 and the pressure upon the piston-rod 13 is released.

As there is likely to be more or less vibration in the space between the casing 5 and the splash-plate 32, a double seal in interposed between the two, and while this might be of any approved construction, the preferred one is that illustrated in Figs. 1 and 2 in which there are two disks 33 and 34 through which the driven shaft 17 extends, and these disks have outwardly extending hubs terminating in ground joints 35 and 36 which bear, respectively, against the inner wall 37 of the centrally located cavity 38 in the hub 47 of the casing 5, as viewed in Fig. 2, and the splash plate 32, to insure a constant and perfect seal and to keep the disks 33 and 34 in place with the ground joints 35 and 36 true and tight.

In the form illustrated, a spring 40 is interposed between the disks 33 and 34 surrounding the shaft 17, and due to the expansive action of this spring 40 these ground joints of the seal are held permanently in place, thereby preventing any leakage of fluid therethrough.

To further insure against leakage, a bellows or accordion 41 surrounds and encloses this portion of the shaft 17, the collar 16, and the spring 40, and the ends of the bellows or accordion are secured to and held in place by the inturned flanges 42 and 43, respectively, of the disks 33 and 34, and in this way the escape of the transmitting fluid is precluded and at the same time flexibility is provided to take care of any movement of the parts between which the seal is placed, and regardless of any vibration or relative movement the ground joints 35 and 36 are constantly held in place.

I claim:

1. The combination of two rotors having opposed buckets opening in a direction toward each other and forming a hydraulic coupling, a shaft having a channel through at least a portion of its longitudinal center and ducts leading therefrom in communication with the space surrounding and between said rotors, a compression cylinder which acts as a compensator and reserve tank adapted to receive fluid and supply it through the channel of the shaft to the rotors, a collar surrounding the shaft and having an annular groove in communication with the cylinder and channel in the shaft, and a seal through which the shaft extends and extending from the rotors to a splash-plate, said seal characterized by disks having ground joints at their centers extending in opposite directions, and in contact with one of the rotors and the splash-plate, respectively, a spring interposed between said disks, and an accordion extending from one disk to the other and surrounding and enclosing a part at least of the shaft, spring and collar to prevent the escape and loss of fluid.

2. A hydraulic coupling including driving and driven rotors forming a fluid chamber therebetween, a case connected with one of the rotors and having a space between it and the other rotor forming an external chamber in communication with the chamber between the rotors at the outer and inner peripheries, thereby forming a circulatory system for fluid between the rotors and around one of them, a driven shaft having a channel formed longitudinally through at least a portion of its length in communication with the external chamber and the chamber between the rotors, a compression cylinder adapted to receive fluid, in communication with the channel of the driven shaft, means surrounding the point of communication between this cylinder and the channel, spring-pressed disks concentric with the driven shaft, and through which the latter turns, and a seal surrounding a portion of the shaft and the said means, said seal comprising a cylindrical sleeve connected at its ends to the disks.

3. A hydraulic coupling including driving and driven rotors forming a fluid chamber therebetween, a case connected with one of the rotors and having a space between it and the other rotor forming an external chamber in communication with the chamber between the rotors at the outer and inner peripheries, thereby forming a circulatory system for fluid between the rotors and around one of them, a driven shaft having a channel formed longitudinally through at least a portion of its length in communication with the external chamber and the chamber between the rotors, a compression cylinder adapted to receive fluid, in communication with the channel of the driven shaft, means surrounding the point of communication between this cylinder and the channel, spring-pressed disks concentric with the driven shaft, and through which the latter turns, and a seal surrounding a portion of the shaft and the said means, said seal comprising a cylindrical sleeve connected at its ends to the disks, a splash-plate cooperatively engaging the stationary housing of the device, said disks having ground joints at their centers, one of which engages one of the rotors, and the other the splash plate, whereby a double seal is formed.

ISAAC C. POPPER.